(12) United States Patent
Wilson

(10) Patent No.: US 6,728,862 B1
(45) Date of Patent: Apr. 27, 2004

(54) PROCESSOR ARRAY AND PARALLEL DATA PROCESSING METHODS

(75) Inventor: Jeremy Craig Wilson, North Delta (CA)

(73) Assignee: Gazelle Technology Corporation, Vancouver (CA)

( * ) Notice: Subject to any disclaimer, the term of this patent is extended or adjusted under 35 U.S.C. 154(b) by 0 days.

(21) Appl. No.: 09/576,871

(22) Filed: May 22, 2000

(51) Int. Cl.[7] .......................... G06F 15/80; G06F 13/40
(52) U.S. Cl. ........................ 712/14; 712/17; 712/21; 712/27; 712/201; 712/225; 709/238; 711/106
(58) Field of Search ................. 712/24, 226, 20, 712/21, 22, 11, 16, 43, 229, 14, 225, 207, 117, 27, 201, 227; 709/238, 239; 711/106; 714/754

(56) References Cited

U.S. PATENT DOCUMENTS

| | | | |
|---|---|---|---|
| 4,314,349 A | 2/1982 | Batcher | 708/230 |
| 4,722,084 A | 1/1988 | Morton | 714/3 |
| 4,751,656 A | 6/1988 | Conti et al. | 716/1 |
| 4,805,091 A | 2/1989 | Thiel et al. | 712/12 |
| 4,827,445 A | 5/1989 | Fuchs | 345/545 |
| 4,967,392 A | 10/1990 | Werner et al. | 345/505 |
| 5,045,995 A | 9/1991 | Levinthal et al. | 712/236 |
| 5,291,431 A | 3/1994 | Ho et al. | 708/630 |
| 5,367,208 A | 11/1994 | El Gamal et al. | 326/44 |
| 5,371,896 A | 12/1994 | Gove et al. | 712/20 |
| 5,388,206 A | 2/1995 | Poulton et al. | 345/505 |
| 5,555,428 A | 9/1996 | Radigan et al. | 712/22 |
| 5,574,933 A | 11/1996 | Horst | 712/28 |
| 5,584,032 A | 12/1996 | Hyatt | 711/100 |
| 5,590,356 A | 12/1996 | Gilbert | 712/31 |
| 5,598,408 A | 1/1997 | Nickolls et al. | 712/11 |
| 5,602,999 A | 2/1997 | Hyatt | 711/1 |
| 5,606,707 A | 2/1997 | Tomassi et al. | 345/418 |
| 5,612,908 A | 3/1997 | Pechanek et al. | 708/490 |
| 5,625,836 A | 4/1997 | Barker et al. | 711/147 |
| 5,649,135 A | 7/1997 | Pechanek et al. | 712/200 |
| 5,680,597 A | * 10/1997 | Kummar et al. | 712/226 |
| 5,682,491 A | 10/1997 | Pechanek et al. | 712/209 |
| 5,724,535 A | 3/1998 | Woudsma et al. | |
| 5,748,872 A | 5/1998 | Norman | 714/11 |
| 5,822,753 A | * 10/1998 | Takano | 711/106 |

(List continued on next page.)

FOREIGN PATENT DOCUMENTS

| | | |
|---|---|---|
| EP | 0726529 A | 8/1996 |
| EP | 0726529 A2 | 8/1996 |
| EP | 0984392 A1 | 3/2000 |
| WO | WO 9608778 A1 | 3/1996 |
| WO | WO 9608778 A | 3/1996 |
| WO | WO98/18073 | 4/1998 |
| WO | WO98/30016 | 7/1998 |

OTHER PUBLICATIONS

Hartenstein et al., *A High Performance Machine Paradigm Based on Auto–Sequencing Data Memory*, HICSS–25, Hawaii Int. Conference on System Sciences, Koloa Hawaii, 1991.

(List continued on next page.)

*Primary Examiner*—Daniel H. Pan
(74) *Attorney, Agent, or Firm*—Oyen Wiggs Green & Mutala

(57) ABSTRACT

An array of processor elements has multiple instruction streams and multiple data streams broadcast to all of the processor elements. The processor elements are each connected to multiple neighbouring processor elements within a cruciate neighbourhood. The architecture is suitable for use in fine-grained applications. The array may have a processor element for each pixel of an image. The array is preferably provided on a single integrated circuit having 10,000 or more processor elements.

34 Claims, 6 Drawing Sheets

U.S. PATENT DOCUMENTS

| | | | |
|---|---|---|---|
| 5,850,489 A | 12/1998 | Rich | 382/304 |
| 5,920,515 A | 7/1999 | Shaik et al. | 714/711 |
| 5,923,338 A | 7/1999 | Rich | 345/505 |
| 5,935,216 A | 8/1999 | Benner et al. | 709/248 |
| 5,941,938 A | 8/1999 | Thayer | 708/490 |
| 5,956,274 A | 9/1999 | Elliott et al. | 365/189.04 |
| 5,982,395 A | 11/1999 | Olson et al. | 345/572 |
| 5,991,884 A | 11/1999 | Lin et al. | 713/300 |
| 6,009,505 A | 12/1999 | Thayer et al. | 712/6 |
| 6,032,264 A | 2/2000 | Beffa et al. | 714/7 |
| 6,038,350 A | 3/2000 | Iwase et al. | 382/304 |
| 6,038,584 A | 3/2000 | Balmer | 712/205 |
| 6,038,682 A | 3/2000 | Norman | 714/10 |
| 6,128,720 A * | 10/2000 | Pechnek et al. | 712/20 |

OTHER PUBLICATIONS

Morton, Steven G., *A Fault Tolerant, Bit–Parallel, Cellular Array Processor*, ITT Advanced Technology Center, Connecticut, 1986, pp. 277–286.

Fineberg et al., *Experimental Analysis of Communication/Data–Conditional Aspects of a Mixed–Mode Parallel Architecture Via Synthetic Computations*, IEEE, pp. 637–646.

Narayanan, P.J., *Processor Autonomy on SIMD Architectures*, Robotics Institute, Carnegie Mellon University, 1993, pp. 127–136.

Potter et al., *ASC: An Associative–Computing Paradigm*, Kent State University, Nov. 1994, pp. 19–25.

PulseDSP Technology Overview, systolix.co.uk/techintro.htm.

Fuzion 150 Product Overview, PFL/004/99 v2. Revised Jan. 2000.

Flynn, Michael J., *Very High–Speed Computing Systems*. Proceedings of the IEEE, vol. 54, No. 12, Dec., 1966, pp1901–1909.

Baker, Johnnie W. and Mingxian Jin, *Simulation of Enhanced Meshes with MASC, a MSIMD Model*, Proceedings of the 11th International Conference On Parallel and Distributed Computing Systems, Nov. 3–6, 1999, Boston, MA, USA.

Abu–Ghazaleh et al., *Flexible Parallel Processing In Memory: Architecture + Programming Model*, pp. 1–7.

ULM, Darrell and Johnnie W. Baker, *Simulating PRAM with a MSIMD model (ASC)*, pp. 1–23.

* cited by examiner

PROCESSOR ARRAY AND PARALLEL DATA PROCESSING METHODS

TECHNICAL FIELD

This invention relates to computers. In particular the invention relates to massively parallel computers having processor arrays and methods for using arrays of processors to solve problems. Specific embodiments of the invention are particularly useful for image processing.

BACKGROUND

Image processing is both computationally intensive and data intensive. By way of example, using an MPEG ("Motion Picture Experts Group") image compression algorithm to compress a 20 Megabytes-per-second television signal in real time may require on the order of 200 billion arithmetic operations per second. The goal of providing cost effective computer systems capable of providing the extremely high throughput required for image processing and similar tasks has so far eluded the computer industry.

One way to achieve higher throughput in computer image processing systems is to use a higher speed processor. The processor could be any of several types commonly in use, such as RISC (reduced instruction set computer), CISC (complex instruction set computer), DSP (digital signal processor), or VLIW (very long instruction word). A basic problem with applying a high speed processor to data intensive applications such as image processing is that the processor typically spends a significant amount of time moving data to and from the memory. Further, when a single processor is used, the inherently parallel nature of many image processing algorithms must be broken down by the programmer into a serial program which works with one or at most a few pixels at a time.

Another common approach to achieving real-time performance in difficult image processing applications is to build custom hardware to perform the image processing. To do so, a problem is typically broken down into its main functional steps, and each step is implemented by different hardware sub systems. The hardware may be provided on an application specific integrated circuit (ASIC) or the like. Such hardware-based solutions do not typically scale up very well to larger image sizes, nor are they readily applicable to other problems.

A further way to achieve higher throughput is to divide the image processing task between many processor elements (PEs). For inherently two-dimensional (2D) problems, such as image processing, which deal with 2-dimensional arrays of data elements, such as pixels, it is natural to arrange a number of processing elements so that each processing element is logically arranged at a node of a 2-dimensional grid. Local connections are provided between neighbouring processors. A natural way to implement many 2D problems is to assign a single processor element to each data element. That is, to provide processor elements arranged at nodes of a mesh which has the same dimensions as the array of data elements that it manipulates. There are many examples of the use of computer processor arrays for solving image processing and other computational problems.

An architecture that assigns only a few data elements per processor element is termed "fine-grained". In contrast, a coarse grained architecture has many data elements assigned to each processor element. M. J. Flynn Very High Speed Computing Systems, Proceedings of the IEEE, Vol. 54, No. 12, pp. 1901–1909 (1966) categorized parallel processing computing systems into three categories: SIMD (single instruction stream, multiple data streams), MIMD (multiple instruction streams, multiple data streams) and MISD (multiple instruction streams, single data stream). In a SIMD system, the same instruction is broadcast to all processor elements. Each processor element has its own set of registers along with some means for it to receive unique data (such as a data value for a particular pixel in an image). In SIMD systems each individual processor element can be simple because it does not require a separate program counter or logic for fetching instructions from memory. Consequently, SIMD arrays can be well suited for fine-grained architectures.

In MIMD architectures every processor element has its own program store and can operate independently of other processor elements. A MIMD processor array may also be termed a "multi-computer", because each processor element is full computer in its own right. MIMD architectures are not as well suited to fine-grained problems such as image processing because each processor element in a MIMD array is more complicated than, and requires larger circuits than, its counterpart in a SIMD array. Further, inter-processor contention for shared resources is an issue because the processor elements in a MIMD array operate independently.

In MISD architectures a single stream of data is passed along a chain of processors with a different operation performed at each step in the chain. Systems which implement MISD architectures are more commonly referred to as systolic arrays, and are well suited to signal processing and video scan line processing, but not well suited to problems such as image compression that require two-dimensional operations.

In a SIMD array it is difficult to implement algorithms where one group of processor elements is required to operate differently from another group of processor elements. In some SIMD architectures individual processor elements can conditionally skip instructions (SIMD architectures without this capability can achieve the effect of condition statements through more complicated mathematical expressions).

Models for studying and modelling parallel computing have been proposed in which there are multiple instruction streams each of which is provided to a specific set of processing elements and multiple data streams. Such models are termed MSIMD models. Typically each instruction stream is associated with a specific data stream.

A key problem with using any parallel array of processors is to program the processors in the array in such a way that the parallelism is well utilized (i.e. so that a good proportion of the processors are kept busy most of the time). As a simple example, consider the following conditional branch structure, coded in the C programming language. Such a conditional sequence might occur where the behaviour of some processor elements (e.g. processor elements processing pixels which are located at the boundary of an image) needs to be different from all other processor elements.

```
if (r0==0)
{
/* Sequence A for non-boundary pixels*/
. . .
}
else
{
/* Sequence B for boundary pixels*/
. . .
}
```

In this example, r0 is the symbolic name for a register in each processor element. The processor element executes either sequence A or sequence B depending on the state of its r0 register. It can be appreciated that if sequence A and sequence B are equally long then each processor element will be utilized only 50% of the time because it will have to skip one or other of the conditional branches. The processor elements all receive the same instruction stream. While a processor element is skipping instructions it is not performing useful work.

A table lookup operation is another example of inefficient utilization of a parallel array. Consider a table lookup operation wherein each processor element is required to retrieve an element from a table based on the contents of a register. Table lookup operations of this type are used commonly, for example, to implement such tasks as colour correction, contrast enhancement, or texture mapping. Typically the table is much larger than the memory available at each processor element. Even if there were sufficient data storage at each processor element it would be a poor use of memory resources to have a copy of the same table in the memory of every processor element. Since each processor element requires access to a specific element of the table either the table will be stored in an external memory the entire table must be broadcast to every processor element. If the table is stored in an external memory then there will be contention problems caused by a large number of processor elements attempting simultaneously to access the table. If the table is broadcast to all of the processor elements then each processor element waits until the appropriate table value is broadcast, and stores only this value. It ignores all other values. It can be appreciated that processor utilization is very low during such look-up operations. Even if the contents of a table are broadcast to processor elements in a number of data streams each processing element must do significant work to obtain the one value from the table that it requires. This increases power consumption of the processor array.

An important characteristic of massively parallel architectures is the way in which processor elements are interconnected with one another. Various interconnection schemes are known. For example, U.S. Pat. No. , 4,314,349 discloses a typical architecture wherein each processor element is connected to its immediate neighbours to the "north", "south", "east", and "west". A problem with such limited connectivity is that any translation operation (combination of horizontal and vertical shifts) can only be implemented as a single processor element step at a time. This is especially a problem for any algorithm that needs to compute a single result that involves all data elements, such as determining the maximum pixel value in an image. In a "four connected neighbourhood" architecture as exemplified by U.S. Pat. No. 4,314,349, it takes at least R×C operations to obtain such a value, where R is the number of rows in the processor array and C is the number of columns in the processor array. The overall result is that individual processor elements spend a lot of time idle while values propagate through the rest of the array. A further problem with such limited connectivity is that the array cannot readily process volumetric (three dimensional) image data because the PEs cannot be reconfigured into a mesh representing a three dimensional structure.

It is also known to connect processor elements at a border of an array to corresponding processor elements on the opposite border. U.S. Pat. No. 5,590,356 discloses an example of such a "torus" architecture. While improving the efficiency of certain image operations, a torus architecture still does not help the global evaluation problem, and it introduces long wiring paths (from one edge of the array to another) that impose lower limits on the data transfer rate between processor elements because of the propagation delays along these long paths.

Some architectures have a much higher degree of connectivity. For example, U.S. Pat. No. 4,805,091, describes an array of processor elements logically arranged at nodes of a many-dimensional hyper-cube and a message routing system which permits each processor element to pass packets of data to another processor element with few intervening steps. While it can achieve more efficient processor utilization than the architectures described above, this type of architecture is difficult to implement in a monolithic array. Long path propagation delays adversely affect the scaleability of the system.

Large arrays of processors can often be made fault tolerant so that, if one or more processors are defective, their functions can be assumed by spare processors. There are a number examples of fault tolerant processor arrays in the academic and patent literature including those disclosed in U.S. Pat. Nos. 4,314,349; 5,625,836; 5,590,356; 5,748,872; 5,956,274; and, 4,722,084. Fault tolerance in memory arrays (e.g. as described by U.S. Pat. Nos. 6,032.264, and 5,920, 515) has proven very beneficial to reducing their price because fault tolerance greatly increases the yield of operational chips. This is especially important because memories are typically very high density, and so especially sensitive to defects. It is much more difficult to provide a fault tolerant processor array than it is to provide a fault tolerant memory array because the cells in a memory array do not need to communicate with each other as do the processors in a processor array. So if a defect in a memory array is avoided by replacing an entire row or column, it is not necessary for the replacement row or column to be located physically adjacent to the defect. However, in a processor array, any fault correction scheme must replace the defective cell in such a way that all the local interconnections are implemented.

There is a need for cost effective computer systems capable of efficiently handling multi-dimensional problems, such as image processing. There is a particular need for such systems capable of handling streams of data, such as video image data in real time. There is a particular need for such systems which are scalable through a wide range of array sizes with a minimum of software or hardware changes.

SUMMARY OF THE INVENTION

This invention provides arrays of processor elements which have advantages over the prior art. One aspect of the invention provides a processor array comprising a plurality of interconnected processor elements, a plurality of instruction buses connected to each of the processor elements, at least one data bus connected to each of the processor elements and a instruction selection switch associated with each of the processor elements. Different processors in the array can be performing instructions in different instruction streams. Each processor element is connected to execute instructions from one of the plurality of instruction buses as selected by its instruction selection switch.

In preferred embodiments each of the processing elements comprises an instruction bus selection register and the instruction selection switch is constructed to select a one of the plurality of instruction buses corresponding to a data value in the instruction bus selection register. The contents of the instruction bus selection register can be changed under software control.

Most preferably the array comprises a plurality of data buses connected to each of the processor elements. A data selection switch associated with each of the processor elements can be used to select one of the data buses. Each processor element can be connected to receive data from a one of the plurality of data buses selected by its data selection switch. The data buses are not necessarily associated with any particular instruction stream.

In preferred embodiments, 1 wherein each of the processor elements is connected to send data to and receive data from other processor elements in a cruciate neighbourhood.

Another aspect of the invention provides a processor array comprising a plurality of interconnected processor elements. Each of the processor elements is logically arranged at an intersection of a row and a column in a grid comprising a plurality of rows and a plurality of columns. Each of the processor elements is connected to transmit data to a plurality of neighbouring processor elements. The plurality of neighbouring processor elements comprising a number N>1 of processor elements in the column on either side of the processor element and a number M>1 of processor elements in the row on either side of the processor element. Preferably N>4 and M>4. Most preferably $M=N=2^n+1$, wherein n is an integer and $n \geq 1$. In currently preferred embodiments $N \geq 9$ and $M \geq 9$.

A further aspect of the invention provides a method for operating a processor array comprising a plurality of processor elements. Each of the processor elements has a plurality of registers which require periodic refreshing at a refresh frequency. The method comprises providing one or more streams of instructions to each of the processor elements for execution by the processor elements and, periodically inserting into the one or more instruction streams register refresh instructions, the register refresh instructions causing the processor elements to rewrite data values in the registers. Preferably the processor element is left in the same state after execution of a refresh instruction as it was before execution of the refresh instruction. This permits refresh instructions to be inserted at any time, as required.

A still further aspect of the invention provides a method for operating a processor array having a plurality of interconnected processor elements. The method comprises providing an array of processor elements, each of the processor elements logically arranged at an intersection of a row and a column in a grid comprising a plurality of rows and a plurality of columns. Each of the processor elements is connected to transmit data to a plurality of neighbouring processor elements, the plurality of neighbouring processor elements comprising a number N of processor elements in the column on either side of the processor element and a number M of processor elements in the row on either side of the processor element. The method continues by determining when one or more of the processor elements is defective; and, for each defective one of the processor elements, ignoring either the row or column containing the defective one of the processor elements. The shape of the neighbour hoods permits rows and/or columns to be ignored while preserving the functionality of the processor array.

A still further aspect of the invention provides a method for implementing a table lookup operation in a processor array. The method comprises: providing a processor array comprising a plurality of processor elements; providing multiple data streams to each processor element; providing a lookup table comprising several parts each part corresponding to a range of values, each of the parts comprising one or more table values; simultaneously transmitting the several parts of the lookup table on the multiple data streams; at each processor element selecting a data stream to access as a function of a data value in the processor element; and, at each processor element retrieving from the selected data stream a table value corresponding to the data value of the processor element.

Further features and advantages of the invention are described below.

BRIEF DESCRIPTION OF THE DRAWINGS

In figures which illustrate non-limiting embodiments of the invention.

LIST OF REFERENCE NUMERALS

| 10 | system | 11 | processor array |
|---|---|---|---|
| 11A | area of array | 12 | processor element |
| 13 | ALU | 14 | instruction stream |
| 15A | row | 15B | column |
| 16 | data stream | 17 | broadcast stream |
| 18 | controller | 19 | memory |
| 20 | array program and data memory | 21 | register set |
| 21A | general purpose registers | 21B | control registers |
| 22 | instruction select register | 23 | data select register |
| 24 | write register | 25 | read register |
| 26 | DMA controller | 27 | i/o clock |
| 28 | clock signal data path | 29 | control bus |
| 30 | row select line | 32 | i/o register |
| 33 | video decoder | 33A | input video stream |
| 34 | memory | 36 | video encoder |
| 37 | instruction stream select switch | 38 | data stream select switch |
| 40 | processor element | 41A–41I | neighboring processor elements |
| 42A–42I | neighboring processor elements | 43A–43I | neighboring processor elements |
| 44A–44I | neighboring processor elements | 45 | neighborhood |
| 46 | local register | 48 | input selection logic |
| 49 | neighbor access logic | 50 | defect register |
| 51 | i/O data line | 52 | i/O data line |
| 53 | status register | 55 | edge i/o bus |
| 60 | defective processor element | 61, 62 | row |
| 63 | processor element | 90 | set of serial data lines |
| 90A–90D | sets of serial data lines | 92 | data lines |
| 92A, 92B | specific data lines | 93 | switch |

Description

I. Overview

Figure 1:
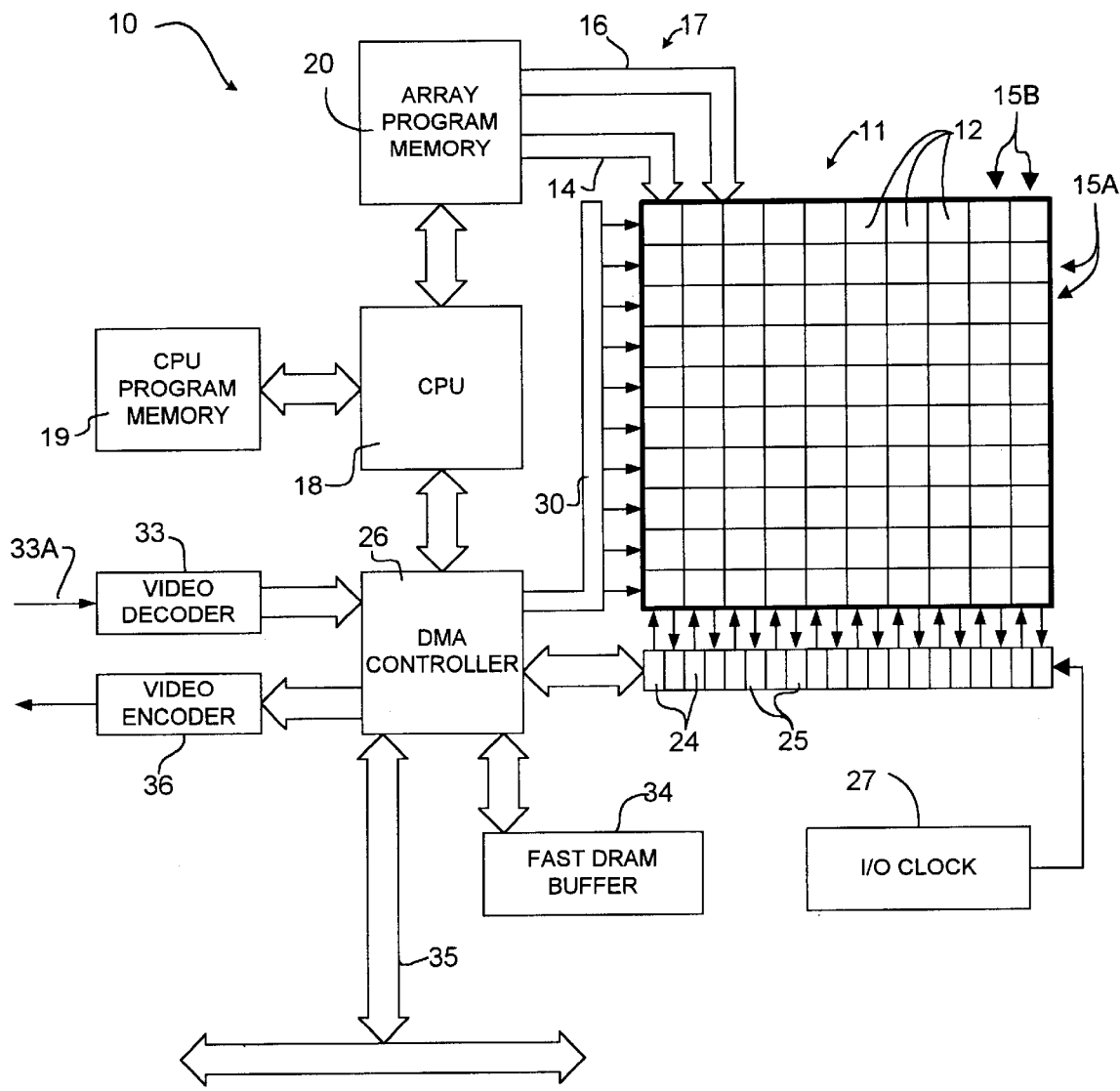
FIG. 1 is a schematic view of a system including a processor array according to the invention.
Figure 2:
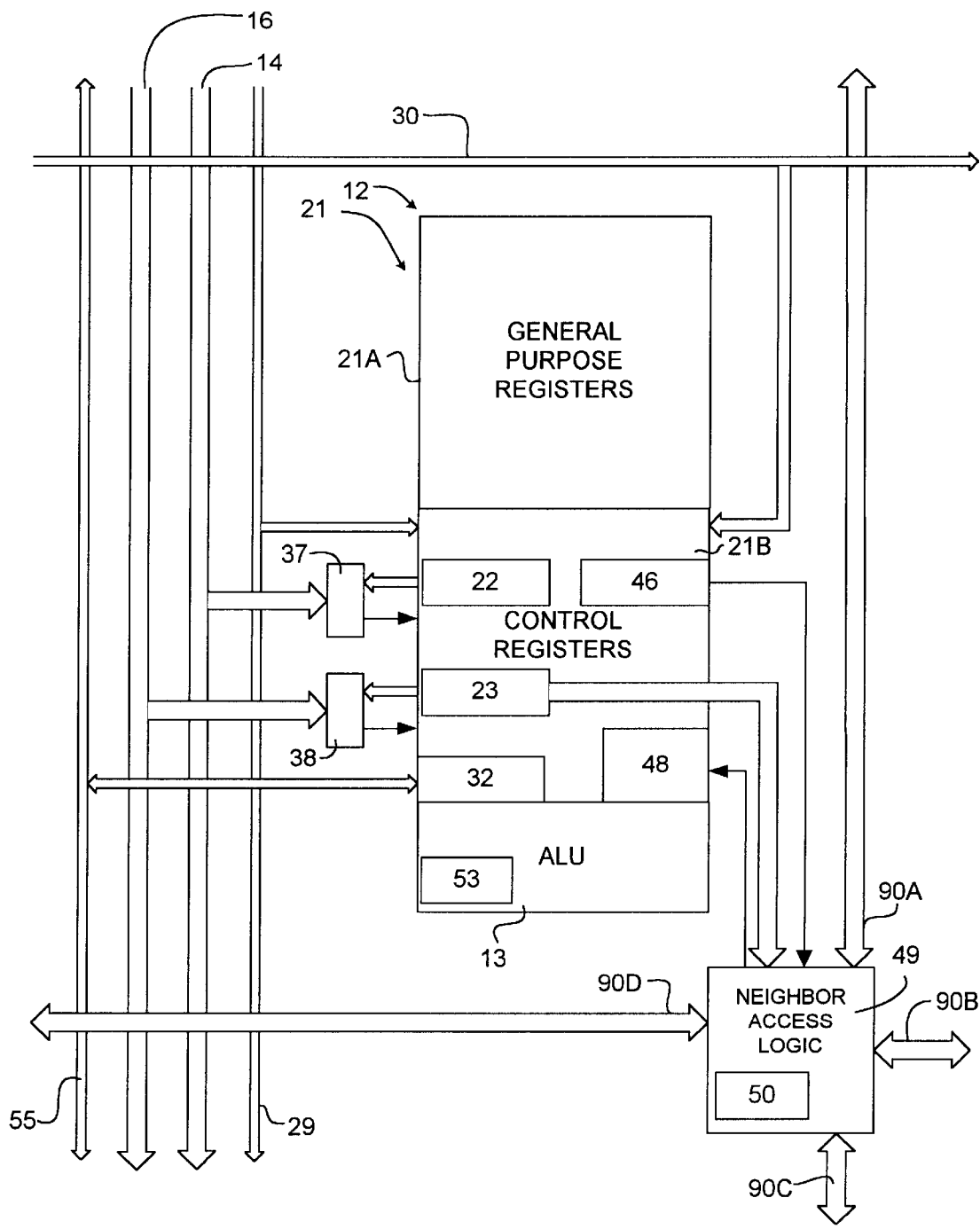
FIG. 2 is a block diagram of a processor element for use in the invention.

FIG. 1 is a schematic view which illustrates the overall structure of a system 10, according to a currently preferred embodiment of the invention. System 10 includes a processor array 11. Array 11 is preferably constructed on a single integrated circuit. Array 11 comprises a large number of processor elements 12 arranged in a 2-dimensional topology. Each processor element 12 is logically arranged at an intersection of a row 15A and a column 15B in a grid comprising a plurality of rows and a plurality of columns. A typical array 11 for image processing applications could have in excess of 10,000 processor elements 12. A preferred embodiment of the invention might, for example, have 19,200 processor elements 12 logically arranged in 160 rows and 120 columns. Preferably all of the processor elements 12 of array 11 are fabricated on a single semiconductor wafer. Control signals such as system timing signals from a system clock (not shown) are provided to processor elements 12 by way of a control bus 29 (FIG. 2).

As is typical in SIMD architectures, instructions and data values are broadcast to every processor element 12. However, in contrast to previous SIMD architectures, array 11 provides multiple instruction streams 14 and multiple data streams 16 which are simultaneously broadcast to every processor element 12. In a currently preferred embodiment of the invention there are 16 broadcast streams, indicated generally by the reference numeral 17, each of which may be used either as an instruction stream 14 or as a data stream 16. Each broadcast stream is carried by a suitable bus. In this specification the term "bus" has the broad meaning "a signal route along which data signals can be passed".

The operation of array 11 is coordinated by a controller 18. Controller 18 may comprise, for example, a conventional CPU (which could be a RSIC, CISC, DSP, or VLIW architecture) running software instructions stored in a memory 19. Controller 18 manages array 11 by causing appropriate broadcast streams 17 to be delivered to processor elements 12 from an array program and data memory 20 and coordinating direct memory access (DMA) operations of DMA controller 26 as described below. Controller 18 could be integrated on a single chip with processor elements 12 or could exist off-chip as a separate component. For video processing applications system 10 preferably includes a video decoder 33 and a video encoder 36.

As described below, the incorporation of multiple broadcast streams 17 which can be configured to provide multiple data streams and multiple instruction streams makes it possible to perform certain operations, such as table look ups very efficiently. Furthermore, The architecture of system 10 can be operated in certain circumstances to provide reduced power consumption as compared to prior architectures.

Preferred Construction of Processor Elements

As shown in FIG. 2, each processor element 12 has a set of registers indicated generally by 21. Some of registers 21 are general purpose registers 21A which processor element 12 can use for storing data and the results of computations. Other ones of registers 21 are control registers 21B which have special purposes. Each processor element 12 has an instruction select register 22 (FIG. 2). The contents of instruction select register 22 controls which one of broadcast streams 17 processor element 12 will look to for instructions to be executed on the processor element 12. In the illustrated embodiment, an instruction stream select switch controlled by the value stored in register 22 selects instructions from one instruction stream 14 and delivers the selected instructions to processor element 12. Each processor element 12 also has a data select register 23. The contents of data select register 23 controls which one of broadcast streams 17 will be looked to by the processor element for data. In the illustrated embodiment, a data stream select switch 38, which is controlled by a value stored in register 23, can select data from one data stream 16 and make data from the selected data stream available to processor element 12.

Table I lists a possible complement of registers for a processor element 12 having 128 possible register addresses.

TABLE I

| ADDRESS | DESCRIPTION |
| --- | --- |
| 0–7 | special purpose registers |
| 8–15 | control, status, instruction stream selection, data stream selection etc. |
| 16–31 | general purpose registers |
| 32–63 | read only data streams (accessed in the same manner as data in registers) |
| 64–127 | read only data from neighbouring processor elements (accessed in the same manner as data in registers) |

Registers 22 and 23 can be modified by processor element 12 under program control. The instruction set for processor elements 12 includes instructions that cause the processor element 12 to switch to a different instruction stream or to switch to a different data stream. Switching to a different instruction stream can be used, as described below, to achieve a function similar to that of a "jump" instruction in a conventional serial processor. Switching to a particular data stream can be used to enhance table look ups.

The specific implementation of a processor element 12 shown in FIG. 2 has 16 general registers, each 16-bits wide. Each general purpose register can conveniently store a colour pixel value, two 8-bit pixels, or the result of an 8-bit by 8-bit multiplication. Instructions are also typically 16-bits wide. The processor elements are preferably individually very small so that a large array 11 can be fabricated on a single chip using suitable VLSI fabrication techniques.

To maintain processor elements 12 small and closely packed, data paths connecting to each processor element 12 and data paths within a processor element 12 are preferably serial. In the preferred embodiment, all data and instructions are shifted into and out of each processor element in bit serial fashion; all instruction and data buses are 1-bit wide; and all arithmetic and logic operations are performed in a bit serial manner.

Where data streams 16 are serial then processor elements 12 can read data from any selected data stream 16 as if the data stream were a local register. The bits from data stream 16 are read sequentially into a register in processor element 12. It is not necessary to provide separate local buffers for storing data from data streams 16 so that it can be read by processor element 12. This can further reduce the size and complexity of processor elements 12.

In the preferred embodiment of the invention, while processor element 12 is executing one instruction, a next instruction is being read into processor element 12 from the currently active instruction stream 14. It is typically not possible to commence performing an instruction until an entire instruction has been received. Where processor element 12 operates serially it is, however, possible to operate on data as it is received since, as noted above, reading data from a serial data stream 16 is not significantly different from reading the same data from a local serial register. This makes it desirable to shift data streams 16 by one cycle relative to the instruction streams 14 which contain instructions for operating on the data of data streams 16. It is convenient to reserve one group of broadcast streams 17 for instructions and another group of broadcast streams 17 for data.

Each processor element 12 has an ALU (arithmetic and logic unit) 13. In the preferred embodiment ALU 13 is preferably a simple 2-bit to 1-bit ALU capable of any 2:1 logic operation, addition, and subtraction. Multiplication can be achieved through a sequence of operations involving addition and bit shifting. While such a bit-serial implementation means that each processor element 12 runs approximately 20 times slower than it could in a bit-parallel implementation, the overall result of being able to pack more processor elements 12 into the same silicon area provides a fine-grained parallelism that is a more natural fit to image related computation problems.

A further benefit of using serial shift registers in processor elements 12 is that the registers 21 can be implemented as dynamic memory rather than static memory. The serial execution process naturally refreshes the contents of any registers used by an instruction. Dynamic registers can typically be implemented with fewer transistors or other circuit elements per bit of storage than can static registers. This permits further reduction in the area occupied by each processor element 12. If registers 21 must be refreshed at a rate of a few KHz, at a 10 MHz instruction rate, it is a small overhead (about 1%) to insert instructions in the instruction streams which do nothing other than refresh the values in registers 21. This approach avoids the need for any special refresh logic As a further refinement, controller 18 could track the usage of registers in array 11 and insert refresh instructions into instruction streams 14 on an as-needed basis. After execution of a refresh instruction a processor element 12 should preferably be in the same state that it was before execution of the refresh instruction so that refresh instructions can be inserted at any point in an instruction stream without affecting any processes running on the processor element.

Figure 5:
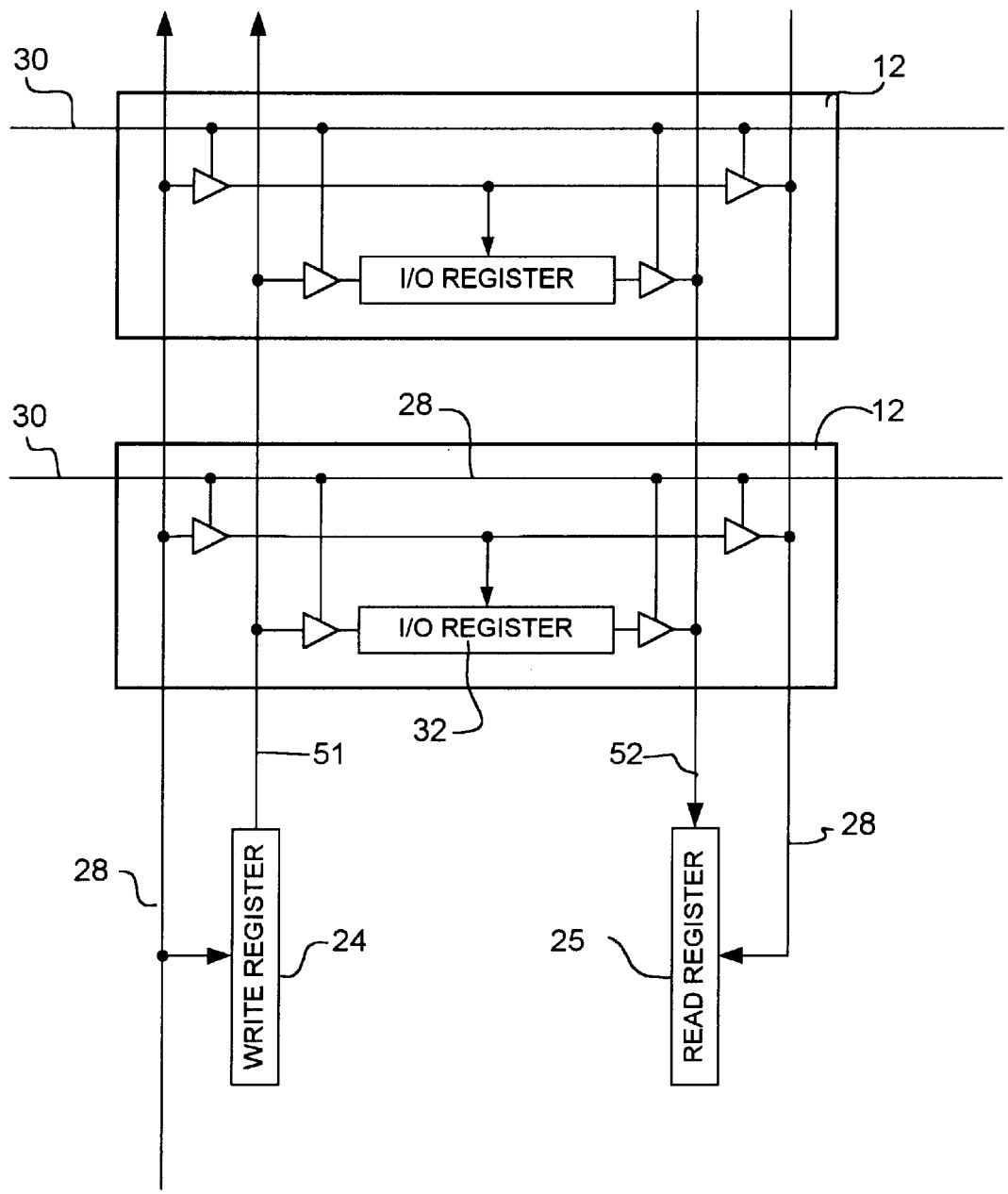
FIG. 5 is a partial schematic block diagram illustrating the connection of read and write edge registers to processor elements in a column of a processor array according to a specific embodiment of the invention; and, FIG. 6 is a simplified schematic diagram illustrating a possible construction for a neighbour access logic circuit for use in a processor element.

A conventional memory, 34 such as DRAM or SRAM may be integrated with array 11 for additional data image storage. This storage could be off chip, or integrated on chip. As best shown in FIGS. 1, 2 and 5, to provide input data to processor array 11, (for example, to provide image data to array 11) and to retrieve results computed by array 11, there is a set of "edge i/o" registers 24, 25. Registers 24 and 25 are controlled by a DMA (Direct Memory Access) controller 26. DMA controller 26 can cause values from write registers 24 to be transferred into registers in processor elements 12 in any selected row of array 11 by way of row select lines 30. Each processor element preferably has a register 32 reserved for such i/o operations. DMA controller 26 can also retrieve data from registers 32 into registers 25.

A preferred implementation has one register 24 (a write register) for delivering data to a selected processing element 12 within each column of array 11 and one register 25 (a read register) for retrieving data from a selected processor element 12 in each column of array 11. To pass data into array 11, DMA Controller 26 first places into write registers 24 the data it wants to place into the array. This data is fetched from any suitable memory accessible to DMA controller 26. For example, the data may be in a local buffer memory 34, on another device or network accessed via a communication bus 35 or data being received in an input video stream 33. A next DMA Controller 26 selects a row of array 11 to which the data in write registers 24 should be delivered by energizing one of row select lines 30. Then, in each column, data is shifted from write register 24 via i/o line 51 into the i/o register 32 of the processor element 12 in the selected row in time with a clock signal.

Data already in the i/o register 32 of the processor element 12 is simultaneously shifted via i/o line 52 to the read register 25 for that column. This happens simultaneously for all columns of array 11. In this example, for each column, write register 24, the i/o register 32 of a processor element 12 in the row selected by DMA controller 26 and read register 25 can be considered to form a single 48 bit shift register (16 bits ×3 registers) which is shifted by 16 bits during the data exchange operation. If data in read registers 25 is of interest then DMA controller 26 may copy the contents of read registers 25 to a suitable memory device.

A clock signal is used to drive the shift operation. The clock signal is preferably carried along a clock signal data path 28 which extends from near write register 24, to the processor element 12 which is being written to and back down to near read register 25. This ensures that the clock signal experiences very similar propagation delays to the bits being transmitted. Rambus™ and other fast memory devices use a similar construction. This makes array 11 fully scaleable (i.e. the clock speed is not determined by the array size). The operation is completed when read register 25 is shifted by 16 clock pulses. Array 11 preferably includes a separate i/o clock 27 for regulating the i/o operations. This permits i/o operations to be performed asynchronously with, and overlap with, the execution of instructions by processor elements 12 as long as the instructions being executed do not read or write to i/o registers 32 while the data exchange operation is occurring. For example the next image in a video sequence can be fed into array 11 as processor elements 12 in array 11 process a previous image.

Row select lines 30, i/o lines 51 and 52 and i/o registers 32 constitute means for selecting one row and means for simultaneously transferring data from each one of the processor elements in a selected row into a corresponding read register. In FIG. 2, i/o lines 51 and 52 and i/o clock lines 28 are collectively indicated by the reference numeral 55.

A separate set of edge i/o registers (not shown) could be placed on the left or right hand edge of array 11 for reading and writing data from selected columns of array 11. In the alternative to reading and writing from an entire row of processor elements 12 at the same time, array 11 could be constructed to have a random access arrangement in which data is written to and/or read from with one specific selected processor element 12 at a time.

Input data for processing by array 11 could come from conventional memory, or from some other device such as a scanner, a video feed, or a network interface. Data output data from array 11 can be stored in any suitable memory device or sent to another device such as a display or network interface.

Interconnections of Processor Elements and Redundancy

Figure 3:
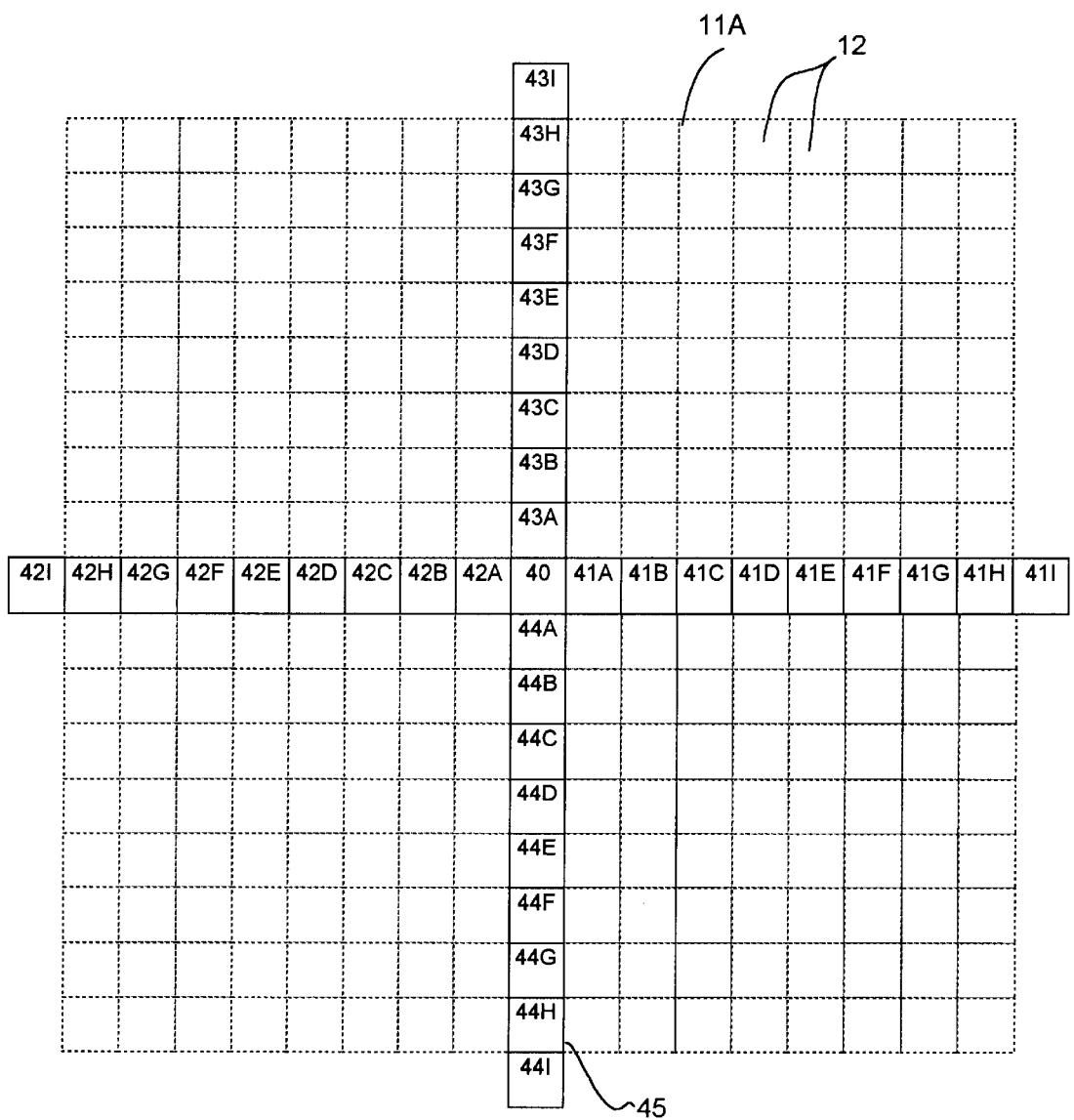
FIG. 3 illustrates the local connectivity of a processor element in a processor array according to a preferred embodiment of the invention.

FIG. 3 illustrates the interconnection of processor elements 12 within an area 11A of array 11. Each square represents one processor element 12. Each processor element 12 is connected to exchange data with a number of other processing elements which are located close to it in array 11. Preferably each processor element 12 is connected to a number N of adjacent processor elements which are located on either side of the processor element in the same row as the processor element and also to a number M of other processor elements which are located on either side of the processor element in the same column as the processor element. In the embodiment of FIG. 3, N=M=9 and each processor element has connections to 36 other processor elements.

Illustrated processor element 40 is connected to processor elements 41A through 41I which are on the same row as processor element 40 and to the right (as viewed in FIG. 3). Processor element 40 is also connected to processor elements 42A through 42I which are on the same row as processor element 40 and to the left. Processor element 40 is also connected to processor elements 43A through 43I which are on the same column as processor element 40 and above processor element 40. Processor element 40 is also connected to processor elements 44A through 44I which are on the same column as processor element 40 and below processor element 40. The surrounding processor elements to which a processor element is connected may be called "neighbouring" processor elements. The set of a processor element 12 and all of its neighbouring processor elements may be called a neighbourhood. In FIG. 3, the cruciate neighbourhood 45 of processor element 40 is outlined with a thick line.

Each connection may be implemented by providing a register 46 (FIG. 2) in each processor element and circuitry to broadcast the contents of register 46 to each neighbouring processor element (e.g. for processor element 40, the contents of register 46 are delivered to each of processor elements 41A through 44I. Register 46 may be termed a "local" broadcast register because it makes a data value available to other processor elements 12 in a local neighborhood. The contents of register 46 can be made available to all neighbouring processor elements. Each processor element 12 therefore has 36 incoming data connections from neighboring processor elements. Preferably, to keep power consumption low, the contents of register 46 are broadcast only upon request of any one of the neighbouring processor elements which is connected to receive the contents of register 46. A neighbouring processor element could request that the contents of register 46 be broadcast, for example, by briefly applying a signal to the same bus on which the contents of register 46 can be broadcast. If any one or more neighboring processor elements transmit such a data request signal then the circuitry broadcasts the contents of local register 46 to the other processor elements in the neighborhood. The data lines by way of which the contents of local register 46 are broadcast to neighboring processor elements and the circuitry in processor element 12 which drives such data lines constitute means for broadcasting the contents of register 46 to neighboring processor elements.

Each processor element 12 preferably has input selection logic 48, which selects a data source for a read operation during any processor cycle. The data source could be a selected one of the 36 neighbour processor elements or a different data source, such as an incoming data stream or the like. Preferably each processor element 12 includes a neighbour access logic unit 49 which selects data presented by one neighbour in the neighbourhood of the processor element for possible access by input selection logic 48.

Figure 6:
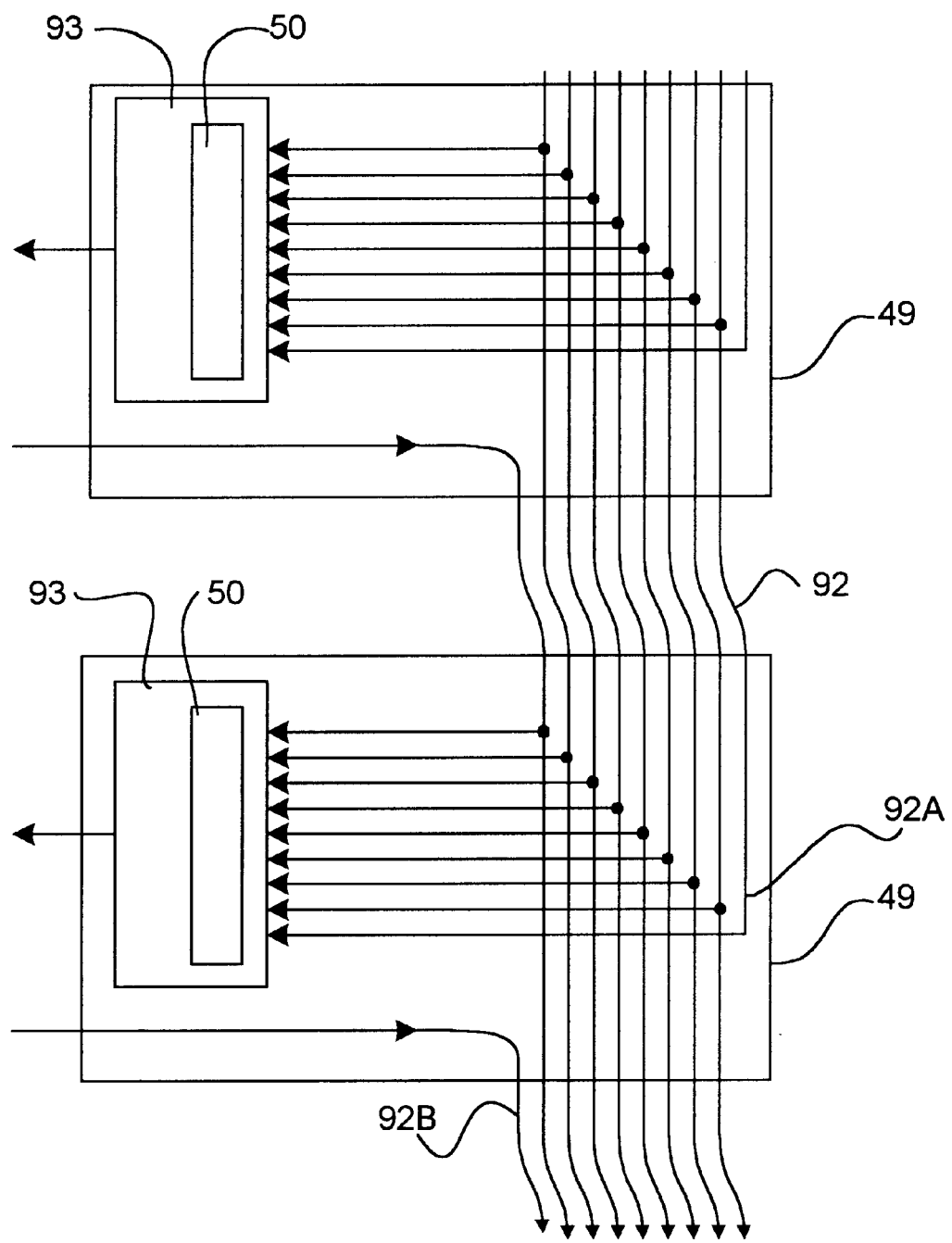

FIGS. 2 and 6 illustrate one possible implementation of neighbor selection logic 49. In the illustration of FIG. 6, neighbour selection logic 49 connects to sets of serial data lines 90. One set 90A of serial data lines connects to neighboring processor elements in the same column as, and above, each processor element 12. Other sets 90B, 90C, 90D connect to neighboring processor elements in other directions. Each set of data lines comprises a subset of data lines for carrying data in each direction.

FIG. 6 shows data lines 92 which are carrying data downwardly from above to two neighbour selection logic units 49 of adjacent processor elements 12. 9 data lines 92 arrive at each neighbour selection logic unit 49. As can be seen in respect of the lowermost one of the two neighbor selection logic units of FIG. 6, one of the data lines 92A terminates at each neighbour selection logic unit 49. One data line 92B originates at each neighbour selection logic 49. Data line 92B carries the value in the "local" register of the associated processor element 12 to neighboring processor elements below.

Another set of data lines 92 (not shown) carry local data signals upwardly from below in the same column. Further sets of data lines 92 (not shown) carry local data signals from left-to-right and right-to-left on the same row.

A switch 93 contains a register 50. Logic in switch 93 causes one of the 9 incoming data lines 92 to be ignored in response to a value in register 50. Register 50 may, for example, be an 8 bit register. The logic value of each bit may determine which of two of data lines is made available for selection by switch 93. For example, the first bit may select between first and second ones of data lines 92, a second bit may select between the second and a third one of data lines 92 and so on. By inserting an appropriate byte value into register 50, 8 of incoming data lines 92 can be chosen. In response to the value in a data select register 23, switch 93 can select one of the 8 available incoming data lines for input to processor element 12 via line 94.

This architecture provides a number of advantages: it provides direct access to a good number of local processor elements in the horizontal and vertical directions of array 11, supporting many typical imaging operations and, it provides indirect access (through two steps) to an even larger area without incurring the logic and wiring overhead of a direct connection.

As described below, the architecture of FIG. 3 can be used to provide a simplified mechanism for dealing with any faulty processor elements 12. The use of cruciate neighbourhoods, as illustrated in FIG. 3, allows faulty processor elements to be bypassed much more simply than could be the case for square neighbourhoods. In the embodiment of FIG. 3, it can be preferable to use only 32 connections to neighbours as active connections and to keep the remaining connections to the most remote neighbouring processor elements for use as a redundant back up as described below.

It can be appreciated that this local broadcast mechanism is contention free: the sending processor element does not need to know which of its neighbour processor elements requested data from its register 46. No processor element needs to be able to directly write a value to a specific register outside itself. Further, the interconnections of processor elements 12 are local in nature. Therefore, the size of array 11 is not limited by the time it takes to broadcast a signal from one processor element to all others (as is the case for various forms of prior art arrays in which individual processor elements have broadcast capability).

Where a processor element 12 is close to an edge of array 11 there may be fewer than N (or M) neighbouring processor elements on one or more sides. For such processor elements the data connections which, but for the intervening edge of array 11, would connect to neighbouring processor elements beyond the edge of array 11 may be connected to fixed data value (for example zero) so that when a processor element close to the edge of array 11 requests data from one of these locations the result is simply the value zero.

Alternatively, the data connections from processor elements 12 near the edge of array 11 could be extended to external connections so that multiple arrays 11 could be combined to create larger arrays. For this latter approach to be implemented it would be necessary to package array 11 in a manner capable of providing the necessary data connections. One can appreciate that, when N is 8, each processor element at the edge of an array 11 would require at least 8 external connections. If array 11 is, for example, a 160×120 array then 4480 data connections would be required for the peripheral processor elements alone. The number of physical connections could be reduced by multiplexing several data connections onto each physical connection.

In the preferred embodiment of the invention, array 11 is fabricated on a single chip. Current fabrication techniques are not perfect. If a large array 11 of processor elements 12 is fabricated on a single chip then it is likely that a few of processor elements 12 will be defective. The embodiment of the invention shown in FIG. 3 can accommodate such faults by effectively ignoring all processor elements in a row or column of array 11 in which the faulty processor element 12 resides.

In this embodiment of the invention each processor element 12 has data connections to a number of neighbouring processor elements in each direction in its row and column. In the preferred embodiment, there are connections to each of the N closest processor elements in the same column above and below the processor element. Each processor element actually uses data connections only to N−1 of these neighbouring processor elements. Each processor element also has connections to each of the M closest processor elements in the same row to the left and right of the processor element. The processor element actually uses only M−1 of these connections. For example, in FIG. 3, M=N=9 but each processor element 12 actually uses only 8 connections in each direction. Each processor element 12 comprises a defect register 50 which includes data which identifies a single row and a single column in each direction to ignore when receiving data from neighbouring processor elements 12.

In a "healthy neighborhood" in which there are no defects within the 17×17 node region centered on a processor element 40 the defect register is set so that the most distant cells 411, 421, 431, and 441 are ignored. If a column within the 17×17 region needs to be ignored, defect register 50 contains data indicating the column to be skipped over. Input selection unit 48 then causes the column in question to be skipped over. Any broadcasts from processor elements 12 in the skipped column are ignored. Processor elements 12 within a row can be ignored in the same manner.

Figure 4:
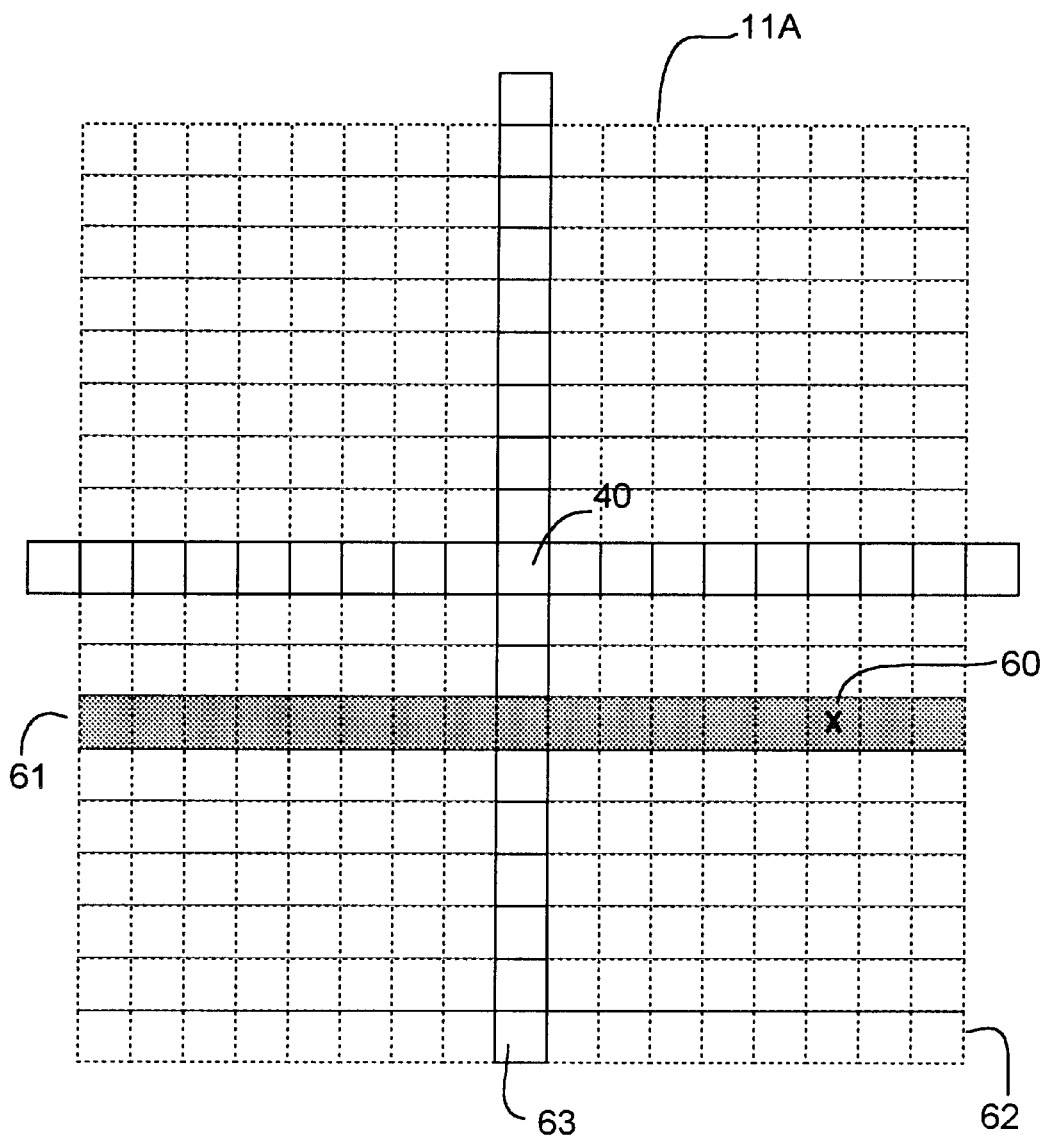
FIG. 4 illustrates an alteration in the local connectivity of the processor array of FIG. 3 to accommodate a defective processor element.

A map of which processor elements 12 are defective can be generated either in production testing, or by way of a POST (Power on Self Test) routine which executes when array 11 is started up. Software designed for locating defective processor elements 12 would execute on array 11 and set the defect registers 50 appropriately. Array 11 is preferably fabricated with enough rows and columns of processor elements 12 to accommodate a number of defects and still provide an array having an effective size suitable for the task at hand. The particular rows and columns of array 11 which should best be disabled to avoid a particular set of defective processor elements 12 can be determined by applying a suitable algorithm. For example, U.S. Pat. No. 4,751,656 assigned to IBM corporation describes one possible algorithm for choosing the best combination of rows and columns in an array to disable for the purpose of removing defective array elements. FIG. 4 illustrates a portion of array 11 having a defective processor element 60. The row 61 containing the defective processor element has been disabled. Defect register 50 of processor element 40 has been set to ignore row 61 and to allow communication with processor element 63 in row 62.

The foregoing arrangement permits the accommodation of defects in array 11 in a very simple manner. This arrangement cannot compensate for all possible distributions of defective processor elements 12. To keep the defect logic simple (so that it does not impact too significantly on the size of processor elements 12), only a single row and single column can be deleted on any one side of any processor element 12. If there are too many defective processor elements 12 within a small region of array 11 then it may not be possible to remove all of the defective processor elements 12.

Where it is not possible to remove all of the defective processor elements 12 in an array 11 there may be a rectangular region within array 11 in which it is possible to compensate for all defective processor elements 12 as described above. This rectangular region may be used as a smaller array 11. Thus chips which incorporate processor arrays 11 according to the invention in which there are a number of defective processor elements can still be used for tasks for which a smaller working array area will suffice. Thus processor arrays according to the invention can be made with a higher effective yield than would be the case if processor arrays 11 which include defective processor elements 12 were suitable only for scrap.

Since, in the preferred embodiment, processor elements only communicate directly with other processor elements which are located physically close by, array 11 can be easily scaled. It is not necessary that a processor element 12 in one part of array 11 be executing an instruction at exactly the same time as another processor element 12 in a remote part of array 11. All that is necessary is that the information in broadcast instruction streams 14 and data streams 16 should take about the same amount of time to reach any given processor element 12 from array program and data memory 20 (or some other source(s) of instructions and data).

Instruction Set

The architecture described above can be used in many different contexts. Processor elements 12 may be implemented in various ways. The following is an example of an instruction set that may be implemented by processor elements 12. The invention is not limited to this instruction set which balances simplicity (so that the area of instruction decode logic is not too large), functionality, and efficient execution of common operations.

In this example, the instructions operate on a 128 register space. Some of the 128 register slots in this register space are associated with physical data storage. Others refer to read-only data streams and data from neighbouring processor elements. One possible register mapping is as follows:

TABLE II

| Register(s) | Description |
| --- | --- |
| r0, r1 | General purpose registers "A" and "B" |
| r2 | local (broadcast to neighbors) |
| r3 | global (linked to edge i/o registers) |
| r4 | operand (right shift function, and byte swap capability via operand2) |

TABLE II-continued

| Register(s) | Description |
| --- | --- |
| r5 | operand2 (byte swapped representation of operand) |
| r6 | row (general reg., but typically stores row address of PE) |
| r7 | col (general reg., but typically stores column address of PE) |
| r8 | instrSel (3 bit instruction stream select) |
| r9 | dataSel (7 bit register address for data or neighbor selection) |
| r10 | status (6 bits of condition flags and state control flags) |
| r11 | defect (16 bit defect control register) |
| r12 (r/o) | DataStr (Data or neighbor stream selected by dataSel) |
| r13, r14 | reserved for future use |
| r15 (r/o) | −1 (constant value for increment and decrement) |
| r16 . . . r31 | general registers (fewer than all of these may actually be used) |
| r32 . . . r63 (r/o) | broadcast data streams (fewer than all of these may actually be used) |
| r64 . . . r127 (r/o) | data from neighbors (fewer than all of these may actually be used) |

(r/o) means "read only" in this Table

Providing a register, such as r5, which contains a byte-swapped representation of an operand is particularly useful for packing and unpacking single byte values into 16-bit registers (e.g. so that two 8-bit pixels can be easily stored in an single register).

In this example, every instruction is a 16 bit value which has the structure: <predicate> <operation>. The execution of the instruction is controlled by a set of two predicate condition bits. The predicate bits select one of four execution options based on the current settings of condition flags in the status register 53 (which have been set by an earlier result). Depending upon the value of the predicate, the instruction will either: execute only if the condition flags indicate that a previous result was less than zero; execute only if the condition flags indicate that a previous result was equal to zero; execute only if the condition flags indicate that a previous result was greater than zero; or always execute without regard to the settings of the condition flags. The use of a predicate to control execution of instructions permits the efficient execution of short conditional sequences for which the overhead of switching to a different stream is not warranted or where the operation of switching to a different stream is itself conditional.

Cases where conditions need to be combined (e.g. where it is desired that the instruction should execute if the previous result was either greater than or equal to zero) can be accommodated by using one extra instruction (e.g. the extra instruction could test the condition flags, if they indicate "greater than zero", then the instruction could set the condition flags with a 0 value. The next instruction could then use a predicate which tests for "equal to zero").

The operation portion of each instruction is 14 bits wide and has one of two possible structures depending upon whether it specifies an operation to perform using the contents of two registers or whether it specifies a value to write to a register. For an operation which operates on the values on two registers the structure of the <operation> field is: <lhs> <rhs> <alu-op> <negate> <test>
Where:
<lhs> is a 2 bit value specifying one of three registers (A, B, or "local");
<rhs> is a 7 bit value specifying any register;
<alu-op> is a 3 bit value defining the ALU operation to perform between lhs and rhs (see Table III);
<negate> is a 1 bit field which, if set, causes the rhs value to be negated prior to use in the ALU; and, <test> is a 1 bit field which, if set, causes the result of the ALU operation that is returned to the lhs register to update the condition flags in the status register.

For an instruction which loads a value into a register the <operation> field has the structure <mark> <reg> <data> where: <mark> is a two bit field that, indicates that this is a register loading operation; <reg> is a 4 bit field which specifies any one of the first 16 registers (r0 . . . r15); and <data> is an 8 bit field containing an immediate value to load into the specified register. This instruction is preferably performed in a single bit-parallel (latching) operation. This ensures that when the instrSel (instruction stream select) register is the destination, the correct instruction stream is selected in time to receive the next instruction on the selected instruction stream. If this control register load operation where done in bit-serial fashion, the control register would not be updated in time for the next instruction to be read in bit-serial manner from the correct stream, in which case there would always need to be a single extra null operation following an instruction stream switch to wait for the change to come into effect. As noted elsewhere, for efficiency it is preferable that each processor element is reading a next instruction while it is executing a current operation.

The status register includes two "mode control" bits for control of left shift and right shift operations. These mode control bits are useful for efficient implementation of multiplication. The <rs> (right shift) mode control bit, if set, causes register r1 to be shifted right by one bit prior to each operation. The least significant bit of the register is moved to the add-enable flag within the ALU, and the most significant bit is sign extended (register r1 is used to store one of the operands for a multiplication operation). If the operation-enable bit of the ALU is set, the operation is performed, otherwise no operation is performed. If the <rs> field is 0, the operation-enable bit is always set to 1.

The <ls> (left shift) mode control bit, if set, causes the rhs result to be shifted left by one bit after the operation has completed, the least significant bit being set to 0.

The following table is an example of operations that may be performed by ALU 13.

TABLE III

ALU OP CODES

| OP CODE | OPERATION | VALUE RETURNED TO LHS | VALUE RETURNED TO RHS |
| --- | --- | --- | --- |
| 0 | no op (null operation) | | |
| 1 | AND | lhs←lhs AND rhs' | rhs←rhs |
| 2 | OR | lhs←lhs OR rhs' | rhs←rhs |
| 3 | XOR | lhs←lhs XOR rhs' | rhs←rhs |
| 4 | add | lhs←lhs + rhs' | rhs←rhs |
| 5 | copy rhs' to lhs | lhs←rhs' | rhs←rhs |
| 6 | copy lhs to rhs | lhs←lhs | rhs←lhs |
| 7 | swap lhs and rhs' | lhs←rhs' | rhs←lhs | if the <negate> bit is set in the instruction, rhs' = −rhs, otherwise rhs' = rhs

EXAMPLE 1

Conditional Branches

The architecture described above permits various parallel data processing operations which are not readily feasible with prior architectures. For example, with an architecture which provides several concurrent instruction streams to processor elements 12 conditional branches can be performed with enhanced efficiency. If we assume that initially all processor elements 12 in array 11 are receiving instructions from a first instruction stream "stream 0", and "Instr-Sel" is the name of the instruction select register 22, then a pseudo code program which included a conditional branch could be constructed as shown in Table IV.

TABLE IV

| Stream 0: | Stream 1: |
|---|---|
| if (r0 ≠ 0) then<br>  InstrSel = 1;<br>/* Sequence A */<br>nop | nop<br><br>/* Sequence B */<br>InstrSel = 0; |

The first instruction in stream 0 causes any processor elements 12 with a non-zero value in register r0 to switch to stream 1. The two different sequences, sequence A and sequence B are then executed in parallel. After both sequences A and B have been completed, the last instruction in stream 1 causes any processor elements 12 executing instructions in stream 1 to switch back to stream 0. If one sequence of instructions is shorter than the other, the processor elements 12 executing that stream can execute null operations (nop) while the processor elements 12 executing the other stream complete the other sequence.

EXAMPLE 2

Table Lookup

With an array 11 according to the invention which has both multiple instruction streams 14 and multiple data streams 16 a table lookup operation can be executed in a reduced number of cycles. Further, each processor element can retrieve a value from the table while performing fewer operations. This can result in lower power consumption by array 11. In one approach a lookup table can be divided into a number of approximately equal-sized blocks. Preferably the table is divided into the same number of blocks as there are available data streams 16. Each block might correspond, for example, to a data value within a certain range. Each processor element 12 in array 11 has a register containing a data value to be looked up in the table. Each processor element 12 performs instructions which cause it to inspect the data value and to identify from the data value one of the blocks corresponding to the data value. The processor elements 12 switch to monitoring a data stream on which the selected block will be broadcast. The blocks are then broadcast in parallel to the processor elements 12 on the multiple data streams 16. Each processor element retains a value from the table which corresponds to the data value being looked up.

As a simple example, array 11 has 4 instruction streams 14, and 4 data streams 16 and each processor element 12 has a value in its r0 register which is an index of the desired table element is in register r0 of each processor element 12. The index is in the range 0 to 63 (the first element of the table has an index of 0, as is common practice in programming languages such as C). Data in the selected data stream is referred to as "DataStr". The looked up value is stored in register r1. A lookup in a table having 32 values could be implemented as shown in Tables V and VI.

TABLE V

| | Instruction Streams | | | |
|---|---|---|---|---|
| Cycle | 0 | 1 | 2 | 3 |
| 1 | dataSel←r0 | | | |
| 2 | InstrSel←<br>r0 >> 2 | | | |
| 3 | r0 = r0 >> 4 | r0←r0 >> 4 | r0←r0 >> 4 | r0←r0 >> 4 |
| 4 | if (r0 = 0)<br>then<br>r1 = DataStr | | | |
| 5 | decrement<br>r0 | if (r0 = 0)<br>then<br>r1←DataStr | | |
| 6 | | decrement<br>r0 | if (r0 = 0)<br>then<br>r1←DataStr | |
| 7 | | | decrement<br>r0 | if (r0 = 0) then<br>r1←DataStr<br>decrement r0 |
| 8 | if (r0 = 0)<br>then<br>r1←DataStr | | | |
| 9 | | if (r0 = 0)<br>then<br>r1←DataStr | | |
| 10 | | | if (r0 = 0)<br>then<br>r1←DataStr | |
| 11 | | | | if (r0 = 0) then<br>r1←DataStr |
| 12 | | InstrSel←0 | InstrSel←0 | InstrSel←0 |

TABLE VI

| | Data Streams | | | |
|---|---|---|---|---|
| Cycle | 0 | 1 | 2 | 3 |
| 1 | | | | |
| 2 | | | | |
| 3 | | | | |
| 4 | Tbl[0] | Tbl[1] | Tbl[2] | Tbl[3] |
| 5 | Tbl[4] | Tbl[5] | Tbl[6] | Tbl[7] |
| 6 | Tbl[8] | Tbl[9] | Tbl[11] | Tbl[11] |
| 7 | Tbl[12] | Tbl[13] | Tbl[14] | Tbl[15] |
| 8 | Tbl[16] | Tbl[17] | Tbl[18] | Tbl[19] |
| 9 | Tbl[20] | Tbl[21] | Tbl[22] | Tbl[23] |
| 11 | Tbl[24] | Tbl[25] | Tbl[26] | Tbl[27] |
| 11 | Tbl[28] | Tbl[29] | Tbl[30] | Tbl[31] |
| 12 | | | | |

All processor elements 12 are initially executing instructions from instruction stream 0. "dataSel" refers to the data stream selection register. The table values (indicated using the indexing notation of "tbl[index]" are sent via the multiple data streams 16. Blank entries in the tables are intended to represent null operations and data values.

The first instruction places the index into the data source register dataSel. Because the data source is only a 2 bit value, the effect is that bits 0 and 1 of the index are used to set the data source register. The next instruction sets the instruction stream. As for the data source register, the instruction source register is only 2-bits. So the effect of the second instruction is to place bits 2 and 3 of the index into the instruction source register (r0>>2 indicates shifting r0 by two places).

The final preparatory step, which is performed by every processor element, is to shift r0 by 4 places, thereby leaving r0 with the remaining bits of the index (in this case only bit 4 is used as the index is a 5 bit value). This, combined with the instruction stream selection, determines on which row processor element 12 accesses the desired table value and stores the table value in register r1.

After processor elements 12 have executed these preparatory steps then the table is broadcast, as shown in Table III, in synchrony with the instruction cycles. Because the size of the table is twice the product of instruction streams and data streams (4×4=16, while the table is 32 elements), the table is effectively divided into two 16 element blocks, and these two main blocks are further divided into 4 sub-blocks (one per data stream). While the table is broadcast, those processor elements 12 which are executing each instruction stream wait for one of two specific cycles in which the appropriate table elements are being broadcast. For example as shown in cycles 4 and 8, the processor elements 12 which are executing the instructions of instruction stream 0 select data values from either the first set of table values being broadcast or the $4^{th}$ set of table values being broadcast depending on the value of the fifth bit of the index initially stored in register r0. When r0 is zero, then the processor element 12 access the data stream selected in cycle 1 and places the data value *data into register r1. The final instruction at cycle 12 returns all processor elements to instruction stream 0.

The overall result is that the time taken to apply the table look-up has been reduced in proportion to the number of data streams (excluding set up and clean up time which is a small overhead for large tables). This is a significant improvement over conventional SIMD array architectures. It is also an improvement over serial architectures, such as architectures using one or more RISC, CISC or VLIW processors. This method reduces the amount of data that needs to be fetched from the data memory of array controller 18 because each element of the array only needs to be fetched a single time. It is straight forward to extend this to larger tables, and to use more or fewer instruction streams or more or fewer data streams.

Processor elements 12 preferably comprise circuitry which uses very little power when the processor element is executing a null operation ("NOP"). It can be seen from inspecting Table II that each processor element is idle during approximately one half of the processing cycles required for the table lookup operation. In other architectures table lookup operations require much higher processor utilization with a commensurate increase in energy consumption.

EXAMPLE 3

Matrix Operations

Certain matrix multiply operations (such as used for the discrete cosine transform commonly used in image compression) require that different processor elements perform calculations using different matrix coefficients based on their position within a local matrix. In these cases the processor element needs to have its own row and column position stored in its registers for use in choosing the appropriate stream. Appropriate coefficients can be effectively delivered to the different processor elements 12 by way of the multiple data streams provided in arrays according to preferred embodiments of the invention.

EXAMPLE 4

Miscellaneous Image Processing Operations

Image processing operations whose behavior changes near an image boundary, as is common for area operations such as filtering, can easily switch processor elements 12 responsible for processing boundary pixels to a different instruction stream to implement their different behaviour. Different instruction streams can also be used to make processor elements 12 responsible for processing even rows of pixels in interlacing or de-interlacing operations perform differently from those processor elements 12 responsible for processing odd rows of pixels.

EXAMPLE 5

Blending Two Images

This simple example assumes that there are two 160 pixel×120 pixel grey level images. Pixel values for a first one of the images are stored in register r16 of each processor element in a 160×120 array of processor elements 12. Pixel values for a second image are stored in register r17 of each processor element. The objective is to place a blended result given by the formula (r16+r17)/2 into a register r18. r0 is used as a temporary register for the operation. A sequence of instructions for execution on each of processor elements 12 which can accomplish this result is shown in Table VII.

TABLE VII

| INSTRUCTION | COMMENTS |
| --- | --- |
| r0 = r16; | |
| r0 = r0 + r17; | |
| operand = r0; | put sum of r16 and r17 in an operand register which supports the right shift function |
| status = RSHIFT_ON; | turn on right shift mode to divide by 2 |
| status = 0; | turn off right shift mode |
| r0 = operand; | get result |
| r18 = r0; | put result in r18 |

This operation can be completed in seven instruction cycles for any size of array.

EXAMPLE 6

Column Addition

This example begins with each processor element in an array 11 having 120 rows holding a pixel values for a grey scale image in a register r16. The objective is to add up the pixel value in each column of array 11 and to place the result in a register r2 of processor elements 12 in row 0 of the array. A sequence of instructions for execution on each of processor elements 12 which can accomplish this objective is shown in Table VIII. In the syntax of this example, "on( )" identifies specific instruction streams which execute the given instruction. Other instruction streams contain null operations. "par" followed by block containing several different instructions means that the instructions in the block are each provided in a separate instruction stream and execute in parallel. The first instruction in the block is delivered in stream 0, the second instruction is delivered in stream 1, and so on.

TABLE VIII

| INSTRUCTION | COMMENTS |
| --- | --- |
| local = r16; | Make contents of register r16 available to neighbours |
| r0 = row; | Get row number of the processor element |
| instrSel = row; | Select instruction stream based on the lower 3-bits of the row number |
| on (0, 2, 4, 6) local = local + down[1]; | Instruction streams for processor elements on "even" rows cause the processor elements to add the value ftom the processor element below them in their column to the value in their "local" register |

TABLE VIII-continued

| INSTRUCTION | COMMENTS |
|---|---|
| on (0, 4) local = local +]down[2]; | Instruction streams for processor elements in every fourth row cause the processor elements to add the value from the processor element two below them in their column to the value in their "local" register |
| on (0) local = local + down[4]; | Processor elements running instructions in stream 0 add the value from the processor element four below them in their column to the value in their "local" register. |
| on (0) repeat (rows/8−1) { local = local + down[8]; } | Every processor element running instructions in stream 0 adds the value from the processor element four below in its column to the value in its "local" register |
| par {on (0) local = local + down[8]; on (1 to 7) instrSel = 0; } | Switch unused PEs back to original instruction stream |

This example illustrates how the cruciate neighborhood structure described above can speed up operations involving summation over rows or columns of an array. An array with only nearest neighbor access would require at least 120 cycles to complete this operation. This example shows that the operation can be performed in only 21 cycles in a system according to the invention. Processor elements which are not required to perform a calculation in any given cycle preferably execute null operations This does not change the result computed, but significantly reduces power consumption.

EXAMPLE 7

MPEG Pattern Match

An MPEG macro-block is a 16×16 pixel region of an image. This is the size of the regions used for motion estimation. A typical method for comparing one region with another is called "sum of absolute difference". The pixels in the two regions are compared by taking the absolute difference between corresponding pixels, and then summing this up to produce a match score. A low value indicates a better match than a high value. The following code illustrates the comparison process for an 8×8 region (it is common to first subsample the image by a factor of 2 for a faster initial search, and then refine that search).

The most time consuming portion of this task is the summation across all the cells in the 8×8 region. The following example illustrates one way to perform motion estimation in a system according to the invention. This example can achieve a high level of utilization of processor elements 12 and completes one motion estimation cycle in just 8 instruction cycles.

A 8×9 block of processor elements 12 is used to process each 8×8 region of an image. One row of 8 processor elements 12 is used to perform final post-processing work of row summation and minima test. The resulting motion estimation vector ends up in the top left processor element of the block. Table VII shows how 8 instruction streams, numbered 0 through 7 are allocated to the processor elements in the 8×9 block.

TABLE IX

| COLUMN==> | 0 | 1 | 2 | 3 | 4 | 5 | 6 | 7 |
|---|---|---|---|---|---|---|---|---|
| ROW | | | | | | | | |
| 0 | 4 | 7 | 6 | 7 | 5 | 7 | 6 | 7 |
| 1 | 0 | 0 | 0 | 0 | 0 | 0 | 0 | 0 |
| 2 | 3 | 3 | 3 | 3 | 3 | 3 | 3 | 3 |
| 3 | 2 | 2 | 2 | 2 | 2 | 2 | 2 | 2 |
| 4 | 3 | 3 | 3 | 3 | 3 | 3 | 3 | 3 |
| 5 | 1 | 1 | 1 | 1 | 1 | 1 | 1 | 1 |
| 6 | 3 | 3 | 3 | 3 | 3 | 3 | 3 | 3 |
| 7 | 2 | 2 | 2 | 2 | 2 | 2 | 2 | 2 |
| 8 | 3 | 3 | 3 | 3 | 3 | 3 | 3 | 3 |

The pixel values for the reference block are in register r1 of processor elements 12. The pixel values for the input block that is being tested for similarity with the reference block are stored in registers r0. Each processor element is executing instructions from the instruction stream identified in Table IX.

Table X shows a sequence of 8 instructions executed by each of the first four instruction streams associated with the 8×8 block.

TABLE X

| | |
|---|---|
| on (0 . . . 3) local = r0; | make input image pixel available to neighbors |
| par { | |
| on (1 . . . 3) local = up[1]; | shift input image down by one pixel |
| on (0) local = up[2]; | processor elements in row 1 executing stream0 must skip over row of post processing processor elements above them |
| } | |
| on (0 . . . 3) { | |
| r0 = local; | save the new input pixel |
| local = local − r1 {?} ; | compare against reference pixel and test |
| {<0?} local = −local; | absolute value |
| } | |
| on (0 . . . 2) local = local + down[1]; on (0, 1) local = local + down[2]; | Now sum up the columns in the 8 × 8 region |
| on (0) local = local + down[4]; | column sum now ready for pickup by post-procesing row |

Table XI lists a sequence of 8 instructions executed by processor elements in the added post-processing row which are executing the last four instruction streams.

TABLE XI

| | |
|---|---|
| on (4 . . . 7) local = down[1]; | Fetch result of last cycle from top of 8 × 8 block |
| on (4 . . . 6) local = local + right[1]; | Continue summation along row |
| on (4 . . . 5) local = local + right[2]; | |
| on (4) { | |
| local = local + right[4]; | Finished summation |
| r0 = min; | Fetch current minimum |
| r0 = r0 − local {?}; | Compare new sum against min |

TABLE XI-continued

| | |
|---|---|
| {>0?} min = local; | If better, store new min |
| {>0?} r1 = shiftPosition; } | and store associated motion vector |

It can be appreciated that in the currently preferred embodiment of the invention, which is described above, there are enough registers 21 within each processor element 12 to hold values for 16 8-bit pixels, with additional free registers to perform useful work on these image values. The result is that an entire 640×480 8-bit image can be held in array 11. Alternatively, significant portions of multiple images can be held in the array at the same time (e.g. four 320×240 images or sixteen 160×120 images). For applications such as pattern matching, this means that the reference image can be kept in the array at all times, rather than needing to repeatedly fetch it from memory. This results in significant image processing performance improvements because it substantially reduces the overhead of fetching and storing image data that is inherent in a serial processor architecture (e.g. RISC, CISC, or VLIW).

As will be apparent to those skilled in the art in the light of the foregoing disclosure, many alterations and modifications are possible in the practice of this invention without departing from the spirit or scope thereof. For example, while the data paths within array 11 have been described as serial data paths the architecture of the invention could also be used with parallel data paths. Data paths 16 and instruction paths 14 could be interchangeable.

While the logical values of flags or bits have been referred to herein as being "1" or "0" to represent logical conditions of TRUE and FALSE respectively, any distinct signals could be used to represent these logic levels.

While each instruction stream and each data stream may be carried on a separate bus, it would be possible in some embodiments of he invention to multiplex several data and/or instructions streams on a ingle bus.

For clarity, certain elements, such as power supplies, power connections, some clock lines and the like, have been omitted from the above drawings and description. Such elements are known to those skilled in the art and are therefore not described herein. For sake of illustration only, power connections may be provided to processor elements 12 by way of a power bus extending parallel to row select lines 30.

Accordingly, the scope of the invention is to be construed in accordance with the substance defined by the following claims.

What is claimed is:

1. A processor array comprising a plurality of interconnected processor elements, a plurality of instruction buses connected to each of the processor elements at least one data bus connected to each of the processor elements and an instruction selection switch associated with each of the processor elements, each processor element connected to execute instructions from a one of the plurality of instruction buses selected by its instruction selection switch wherein a ratio of the number of processor elements in the processor array to the number of instruction buses in the processor array is greater than 100:1.

2. The processor array of claim 1 a wherein each of the processing elements comprises an instruction bus selection register and the instruction selection switch is constructed to select a one of the plurality of instruction buses corresponding to a data value in the instruction bus selection register.

3. The processor array of claim 1 comprising a plurality of data buses connected to each of the processor elements.

4. The processor array of claim 3 comprising a data selection switch associated with each of the processor elements, each processor element connected to receive data from a one of the plurality of data buses selected by its data selection switch.

5. The processor array of claim 4 wherein each of the processing elements comprises a data bus selection register and the data selection switch is constructed to select a one of the plurality of data bases corresponding to a data value in the data bus selection register.

6. The processor array of claim 1 wherein each of the processor elements is connected to send data to other processor elements in a cruciate neighbourhood.

7. The processor array of claim 1 wherein the processor elements are arranged in a plurality of rows and a plurality of columns and each of the processor elements has direct data connections only to neighboring processor elements in the same row or column as the processor element.

8. The processor array of claim 1 wherein a ratio of the number of processor elements in the processor array to the number of instruction buses in the processor array is greater than 1000:1.

9. The processor array of claim 1 wherein the data buses comprise serial data buses.

10. The processor array of claim 1 comprising a plurality of data streams connected to each of the processor elements.

11. The processor array of claim 1 packaged on a single integrated circuit.

12. The processor array of claim 11 wherein the processor array comprises at least 10,000 of the processor elements.

13. The processor array of claim 1 wherein each of the processor elements is located at a node of a grid comprising a plurality of rows and a plurality of columns.

14. A processor array comprising a plurality of interconnected processor elements, plurality of instruction buses connected to each of the processor elements, at least one data bus connected to each of the processor element and an instruction selection switch associated with each of the processor elements, each processor element connected to execute instructions from a one of the plurality of instruction buses selected by its instruction selection switch, wherein each of the processor elements is connected to send data to other processor elements in a cruciate neighbourhood, each of the processor elements comprises a local register and the processor element is connected to broadcast data in the local register simultaneously to other processor elements in a the cruciate neighbourhood.

15. The processor array of claim 14 wherein each of the processor elements comprises a circuit connected to receive a data request signal indicating that at least one other processor element in the neighborhood has requested that the contents of the register be broadcast and the circuit is adapted to broadcast the contents of the register only if a data request signal has been received.

16. A Processor array comprising a plurality of interconnected processor elements, a plurality of instruction buses connected to each of the processor elements, at least one data bus connected to each of the processor elements and an instruction selection switch associated with each of the processor elements, each processor element connected to execute instructions from a one of the plurality of instruction buses selected by its instruction selection switch, wherein each of the processor elements is connected to send data to other processor elements in a cruciate neighbourhood, and each of the processor elements comprises a register and selection logic the selection logic configured to receive data from a particular one of the other processor elements in the cruciate neighbourhood as determined by the value in the register.

17. A processor array comprising a plurality of interconnected processor elements, a plurality of instruction buses connected to each of the processor elements, at least one data bus connected to each of the processor elements and an instruction selection switch associated with each of the processor elements, each processor element connected to execute instructions from a one of the plurality of instruction buses selected by its instruction selection switch, wherein each of the processor elements is connected to send data to other processor elements in a cruciate neighbourhood and wherein the cruciate neighbourhoods each comprise four arms radiating from a processor element and each arm comprises at least two processor elements.

18. A processor array comprising a plurality of interconnected processor elements, a plurality of instruction buses connected to each of the processor elements, at least one data bus connected to each of the processor elements and an instruction selection switch associated with each of the processor elements, each processor element connected to execute instructions from a one of the plurality of Instruction buses selected by its instruction selection switch, wherein the processor elements are arranged in a plurality of rows and a plurality of columns and each of the processor elements has direct data connections only to neighboring processor elements in the same row or column as the processor element and each processor element has direct data connections to a plurality of neighbouring processor elements on each side of the processor element in the same row as the processor element and a plurality of neighbouring processor elements on each side of the processor element in the same column as the processor element.

19. A processor array comprising a plurality of interconnected processor elements, each of the processor elements logically arranged at an intersection of a row and a column in a grid comprising a plurality of rows and a plurality of columns, each of the processor elements connected to transmit data to other processor elements in a neighborhood comprising a plurality of neighbouring processor elements, the plurality neighbouring processor elements comprising a number N>1 of processor elements in the column on either side of the processor element and a number M>1 of processor elements in the row on either side of the processor element wherein one or more instruction buses are connected to deliver a plurality of instruction streams from an instruction source to each of the processor elements, one or more data buses are connected to deliver at least one data stream from a data source to each of the processor elements and one or more clock buses are connected to deliver a clock signal from a clock to each of the processor elements, wherein, for each of the processor elements, propagation times to the processor element from the data source on the one or more data buses, from the instruction source on the one or more instruction buses and from the clock on the one or more clock buses are substantially the same.

20. A processor array comprising a plurality of interconnected processor elements, each of the processor elements logically arranged at an intersection of a row and a column in a grid comprising a plurality of rows and a plurality of columns, each of the processor elements connected to transmit data to other processor elements in a neighborhood comprising a plurality of neighbouring processor elements, the plurality of neighbouring processor elements comprising a number N>1 of processor element in the column on either side of the processor element and a number M>1 of processor elements in the row on either side of the processor element wherein each of the processor elements comprise an i/o register and the array comprises a set of read registers, the read registers comprising one read register for each of the columns, a first i/o data line connecting each i/o register to a corresponding read register; and, row select logic connected to select all of the processor elements in one of the rows, wherein, when one of the rows is selected, data from i/o registers of processor elements in the selected row is written to the corresponding read registers by way of the first i/o data lines.

21. The processor array of claim 20 comprising an output system clock and circuitry for moving data from the i/o registers to the read registers in time with a clock signal generated by the output system clock.

22. The processor array of claim 21 wherein the processor array comprises a processor timing clock, which is separate from the output system clock, the processor timing clock providing a clock signal to each of the processor elements.

23. The processor array of claim 21 comprising a plurality of write registers, the write registers comprising one write register for each of the columns, and a second i/o data line connecting each i/o register to a corresponding write register.

24. The processor array of claim 23 wherein the first and second i/o data lines are serial data lines and the processor array is configured to bitwise shift a value from a write register to the i/o register of a corresponding processor element in a selected row and to simultaneously bitwise shift a value from the i/o register of the corresponding processor element to the corresponding read register.

25. A processor array comprising a plurality of interconnected processor elements, each of the processor elements logically arranged at an intersection of a row and a column in a grid comprising a plurality of rows and a plurality of columns, each of the processor elements connected to transmit data to other processor elements in a neighborhood comprising a plurality of neighbouring processor elements, the plurality of neighbouring processor elements comprising a number N>1 of processor elements in the column on either side of the processor element and a number M>1 of processor elements in the row on either side of the processor element wherein each of the processor elements comprises means for simultaneously broadcasting the contents of a local register to all other processor elements in we neighbourhood.

26. The processor array of claim 25 wherein N>4 and M>4.

27. The processor array of claim 26 wherein N≧9 and M≧9.

28. The processor array of claim 25 wherein M=N=2n+1, wherein n is an integer and n≧1.

29. The processor array of claim 25 wherein each of the processor elements comprises a register and selection logic the selection logic configured to receive data from a particular one of the other processor elements in the neighbourhood as determined by the value in the register.

30. The processor array of claim 25 wherein each of the processor elements comprises a plurality of registers of a type which require dynamic refreshing.

31. A processor array comprising a plurality of interconnected processor elements, each of the processor elements logically arranged at an intersection of a row and a column in a grid comprising a plurality of rows and a plurality of columns, each of the processor elements connected to transmit data to other processor elements in a neighborhood comprising a plurality of neighbouring processor elements, the plurality of neighbouring processor elements comprising a number N>1 of processor elements in the column on either side of the processor element and a number M>1 of processor elements in the row on either side of the processor element comprising a plurality of read registers, one read register corresponding to each of the columns, means for selecting one of the rows and means for simultaneously transferring data from each one of the processor elements in a selected row into a corresponding read register.

32. A method for operating processor array comprising a plurality of processor elements, each of the processor elements comprising a plurality of registers, each of the plurality of registers in each of the processor elements comprising registers which require dynamic refreshing at a refresh frequency, the method comprising:
   a) providing one or more streams of instructions to each of the processor elements for execution by the processor elements; and,
   b) periodically inserting into the one or more iron streams register refresh instructions, the register refresh instructions causing the processor elements to rewrite data values in the registers.

33. A method for operating a processor array having a plurality of interconnected processor elements, the method comprising:
   a) providing an array of processor elements, each of the processor elements logically arranged at an intersection of a row and a column in a grid comprising a plurality of rows and a plurality of columns, each of the processor elements connected to transmit data to a plurality of neighbouring processor elements, the plurality of neighbouring processor elements comprising a number N, with N>1 of processor elements in the column on each side of the processor element and a number M, with M>1, of processor elements in the row on each side of the processor element;
   b) determining when one or more of the processor elements is defective; and,
   c) for each defective one of the processor elements, ignoring either the row or column containing the defective one of the processor elements.

34. A method for implementing a table lookup operation in a processor array, the method comprising:
   a) providing a processor array comprising a plurality of processor elements;
   b) providing multiple data streams to each processor element;
   c) providing a lookup table comprising several parts each part corresponding to a range of values, each of the parts comprising one or more table values;
   d) simultaneously transmitting the several parts of the lookup table on the multiple data streams;
   e) at each processor element selecting a data stream to access as a function of a data value in the processor element; and,
   f) at each processor element retrieving from the selected data stream a table value corresponding to the data value of the processor element.

* * * * *